US011899487B2

(12) United States Patent
Kimura

(10) Patent No.: US 11,899,487 B2
(45) Date of Patent: Feb. 13, 2024

(54) REFERENCE VOLTAGE CIRCUIT INCLUDING TRANSISTOR

(71) Applicant: WILL SEMICONDUCTOR (SHANGHAI) CO. LTD., Shanghai (CN)

(72) Inventor: Hiroyuki Kimura, Sendai (JP)

(73) Assignee: WILL SEMICONDUCTOR (SHANGHAI) CO. LTD., Shanghai (CN)

( * ) Notice: Subject to any disclaimer, the term of this patent is extended or adjusted under 35 U.S.C. 154(b) by 0 days.

(21) Appl. No.: 17/835,160

(22) Filed: Jun. 8, 2022

(65) Prior Publication Data

US 2023/0376065 A1 Nov. 23, 2023

(30) Foreign Application Priority Data

May 19, 2022 (CN) ......................... 202210553007.0

(51) Int. Cl.
*G05F 3/30* (2006.01)
*G05F 1/46* (2006.01)

(52) U.S. Cl.
CPC ................ *G05F 3/30* (2013.01); *G05F 1/461* (2013.01); *G05F 1/468* (2013.01)

(58) Field of Classification Search
CPC ............. G05F 3/30; G05F 1/461; G05F 1/468
See application file for complete search history.

(56) References Cited

U.S. PATENT DOCUMENTS

2009/0066313 A1* 3/2009 Kimura .................. G05F 3/262 323/313
2014/0152290 A1* 6/2014 Huang ..................... G05F 3/30 323/314

* cited by examiner

*Primary Examiner* — Jue Zhang
*Assistant Examiner* — Lakaisha Jackson
(74) *Attorney, Agent, or Firm* — MUNCY, GEISSLER, OLDS & LOWE, P.C.

(57) ABSTRACT

The present invention includes: a first current source, through which a first current is made to flow; a second current source, through which a second current set at a certain ratio to the first current is made to flow; a first current path, which includes a second resistor, a first resistor, and a first bipolar transistor that are connected to the first current source in a sequential manner, and through which the first current is made to flow; a second current path, which includes a third resistor and a 0th bipolar transistor that are connected to the second current source in a sequential manner, and through which the second current is made to flow; an operational amplifier, which controls current amounts of the first current and the second current by an output from an output end, and of which a positive input end is connected to a connection point between the second resistor and the first resistor, and of which a negative input end is connected to a connection point between the third resistor and the 0th bipolar transistor; and a buffer amplifier, which outputs a reference voltage, and of which a positive input end is connected to a connection point between the second current source and the third resistor, and of which a negative input end is connected to an output end; wherein an area ratio of the first bipolar transistor to the 0th bipolar transistor is n:1, and a reference voltage of which temperature dependence is corrected is obtained by adjusting resistance values of the first and the third resistor and a value of the area ratio n.

6 Claims, 3 Drawing Sheets

REFERENCE VOLTAGE CIRCUIT INCLUDING TRANSISTOR

BACKGROUND OF THE INVENTION

1. Field of the Invention

The present invention relates to a reference voltage circuit using bipolar transistors.

2. Description of the Related Art

Conventionally, a reference voltage circuit (referred to as the bandgap reference voltage circuit) obtains a temperature-compensated bandgap reference voltage by using a bandgap voltage of a bipolar transistor is known.

The reference voltage circuit generates a reference voltage of which temperature dependence is suppressed by causing the positive temperature dependence and the negative temperature dependence generated by two circuit blocks to offset each other.

Here, there is a requirement to reduce the number of bipolar transistors as much as possible for semiconductors that use transistors such as MOSFETs. In addition, there is a requirement to reduce the influence of noise from an output end of the reference voltage.

SUMMARY OF THE INVENTION

A reference voltage circuit according to the present invention includes:

- a first current source, through which a first current is made to flow;
- a second current source, through which a second current set at a certain ratio to the first current is made to flow;
- a first current path, which includes a second resistor, a first resistor, and a first bipolar transistor that are connected to the first current source in a sequential manner, and through which the first current is made to flow;
- a second current path, which includes a third resistor and a 0th bipolar transistor that are connected to the second current source in sequential manner, and through which the second current is made to flow;
- an operational amplifier, which controls current amounts of the first current and the second current by an output from an output end, and of which a positive input end is connected to a connection point between the second resistor and the first resistor, and of which a negative input end is connected to a connection point between the third resistor and the 0th bipolar transistor; and
- a buffer amplifier, which outputs a reference voltage, and of which a positive input end is connected to a connection point between the second current source and the third resistor, and a negative input end of which is connected to an output end; wherein
- an area ratio of the first bipolar transistor to the 0th bipolar transistor is is n:1, and
- a reference voltage of which temperature dependence is corrected is obtained by adjusting resistance values of the first and the third resistor and a value of the area ratio n.

According to the reference voltage circuit of the present invention, by adjusting resistance values of the third resistor and the first resistor R1 and the area ratio n of the two bipolar transistors, a reference voltage of which temperature dependence is suppressed can be obtained, and the intrusion of noise from the output end can be suppressed by the buffer amplifier.

PREFERRED EMBODIMENT OF THE PRESENT INVENTION

Hereinafter, embodiments of the present invention are described with reference to the drawings. It should be noted that the following embodiments are not intended to limit the scope of the present invention, and configurations formed by selectively combining multiple examples are also included in the present invention.

[Circuit Configuration]

Figure 1:
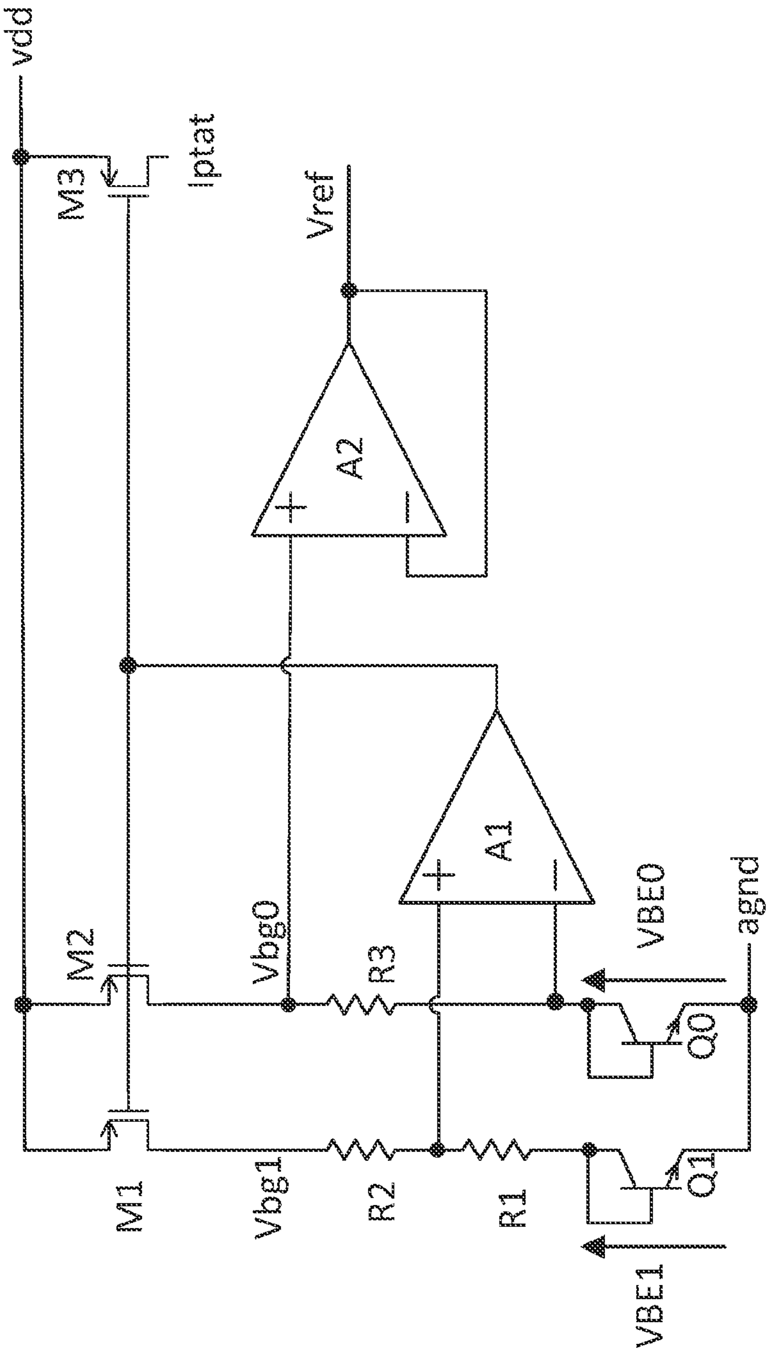
FIG. 1 is a circuit diagram showing an example of a reference voltage circuit (bandgap reference voltage circuit) according to an embodiment of the present invention.

FIG. 1 is a circuit diagram showing an example of a reference voltage circuit according to an embodiment of the present invention. The reference voltage circuit is disposed in a semiconductor integrated circuit that uses a complementary MOS (CMOS) gate, for example.

A power supply vdd supplies a predetermined positive voltage (for example, 5 V). A first current path CP1 and a second current path CP2 are connected to the power supply vdd. The other ends of the first current path CP1 and the second current path CP2 are connected to ground agnd.

The first current path CP1 includes a first transistor M1, a second resistor R2 (referred to as the "resistor R2" hereinafter), a first resistor R1 (referred to as the "resistor R1" hereinafter), and a first bipolar transistor Q1 that are connected in series from the power supply vdd toward the ground agnd in a sequential manner.

The first transistor M1 is a p-channel metal oxide semiconductor field effect transistor (MOSFET), and the source of the first transistor M1 is connected to the power supply vdd. Note that the first transistor M1 functions as a first current source. The resistor R1 and the resistor R2 are connected in series to the drain of the first transistor M1. The first bipolar transistor Q1 connected to the other end of the resistor R2 is an npn-type bipolar transistor. To note on the first bipolar transistor Q1, there is a short between the base and the collector, the source is connected to the resistor R2, and the emitter is connected to the ground agnd.

The second current path CP2 includes a second transistor M2, a third resistor R3 (referred to as the "resistor R3" hereinafter), and a 0th bipolar transistor Q0 that are connected in series from the power supply vdd toward the ground agnd in a sequential manner. The second transistor M2 is a p-channel metal oxide semiconductor field effect transistor (MOSFET), and the source of the second transistor M2 is connected to the power supply vdd.

Note that the second transistor M2 functions as a second current source. The resistor R3 is connected to the drain of the second transistor M2. The 0th bipolar transistor Q0 connected to the other end of the resistor R3 is an npn-type bipolar transistor. To note on the 0th bipolar transistor Q0, there is a short (diode connection) between the base and the collector, the source of which is connected to the resistor R3, and the emitter of which is connected to the ground agnd.

A connection point between the resistor R2 and the resistor R1 of the first current path CP1 is connected to the positive input end of an operational amplifier A1. In addition, a connection point between the second transistor M2 and the resistor R3 of the second current path CP2 is connected to the negative input end of the operational amplifier A1. Besides, gates of the first transistor M1 and the second transistor M2 are commonly connected to the output end of the operational amplifier A1.

An area (emitter area) ratio of the first bipolar transistor Q1 to the 0th bipolar transistor Q0 is n:1, and when a reverse saturation current of the 0th bipolar transistor Q0 is set as is0, then a reverse saturation current is1 of the first bipolar transistor Q1 equals n*is0. In addition, in this example, the current iM1 made to flow by the first transistor M1 and the second transistor M2 and the current iM2 made to flow by the second transistor M2 are the same, that is, iM1=iM2. Note that iM1 and iM2 can still be used even if iM1 and iM2 are not the same, as long as iM1 and iM2 are at a constant ratio.

Moreover, in this example, there is a third transistor M3 of which the gate is commonly connected to the gates of the first transistor M1 and the second transistor M2. The third transistor M3 is also a p-channel MOSFET, the source of the third transistor M3 is connected to the power supply vdd, and a current which is made to flow by the third transistor M3 is the same as the currents which are made to flow by the first transistor M1 and the second transistor M2. Note that the current flowing through the third transistor M3 is referred to as "iptat". The current iptat of the third transistor M3 can be monitored.

Furthermore, the connection point between the resistor R3 and the second transistor M2 is connected to the positive input end of a buffer amplifier A2, and a reference voltage Vref is output from the output end of the buffer amplifier A2. Note that there is a short circuit between the negative input end and the output end of the buffer amplifier A2.

Next, operations of the circuit shown in FIG. 1 are described.

<Setting Conditions>

The first transistor M1 and the second transistor M2 are transistors having the same characteristics (M1=M2). Therefore, the currents of the first transistor M1 and the second transistor M2 are set to be the same (iM1=iM2). Alternatively, the currents of the first transistor M1 and the second transistor M2 may be set in an arbitrary ratio, and the magnitude of an error signal between the two current paths can be adjusted. Moreover, in the design, it is advisable to adjust the respective resistance values to values inversely proportional to values of the flowing currents in order that voltages generated by the respective resistors do not change. In addition, the area (emitter area) ratio of the first bipolar transistor Q1 to the 0th bipolar transistor Q0 is n:1 (Q1:Q0=n:1). Here, n may be a positive integer, or may not be an integer.

The base-emitter voltage of the first bipolar transistor Q1 is set as VBE1, the base-emitter voltage of the 0th bipolar transistor Q0 is set as VBE0, the voltage of the connection point between the first transistor M1 and the resistor R2 is set as Vbg1, and the voltage of the connection point between the second transistor M2 and the resistor R3 is set as Vbg0. Lastly, resistance values of the resistors R1 R2, and R3 are set as R1, R2, and R3, respectively.

<Operation>

The voltage of the positive input end of the operational amplifier A1 is to VBE1+R1*M1, and the voltage of the negative input end is VBE0.

Thus, the operational amplifier A1 controls the gates of M1 and M2 so that VBE1+R1*iM1=VBE0, and the amounts of the currents iM1 and iM2 are determined.

In addition, the base-emitter voltage VBE0 of the 0th bipolar transistor Q0 is $$VBE0=vt*\ln(iM2/is0),$$

and the base-emitter voltage VBE1 of the first bipolar transistor Q1 is $$VBE1=vt*\ln(iM1/n*is0).$$

Here, vt=kT/Q, and is0 denotes the reverse saturation voltage of the 0th bipolar transistor Q0 as described above. In addition, k denotes the Boltzmann constant, T denotes absolute temperature, and Q denotes elementary charge.

Thus, $$R1*iM1=VBE0-VBE1=vt*\ln(iM2/is0)-vt*\ln\{iM1/(n*is0)\}=vt*\ln(iM2*n/iM1),$$

and since iM1=iM2 and vt=kT/Q, $$iM1=[k*\ln(n)/(Q*R1)]*T.$$

In addition, the current which is made to flow by the third transistor M3 is the same as iM1, and iM1=iptat.

Here, approximation is performed by VBE0=Eg/Q−mT. A representative value of m is 2.2 mV/K, and Eg denotes bandgap. For Si, Eg=1.21 eV (representative value: the 0 K intersection point in the first-order approximation), and an actual value at 0 K is 1.165 eV.

And, the two-end voltage Vr3 of the resistor R3 is $$Vr3=iM1*R3=[k*\ln(n)/(Q*R1)]*R3*T.$$

Here, Vbg0=VBE0+Vr3, and when the temperature coefficient in of VBE0 and the temperature coefficient [k*ln(n)/(Q*R1)]*R3 of Vr3 are equal, m does not change due to the temperature T.

Thus, by adjusting the values of n, R1, and R3 of m=[k*ln(n)/(Q*R1)]*R3, Vbg0 can be set to be independent of temperature.

Furthermore, by causing R2 to equal to R3, source-drain voltages (Vds) of the first transistor M1 and the second transistor M2 become equal, then the error between M1 and M2 becomes smaller.

In addition, in the embodiment, the voltage vbg0 is not directly output, but is output via the buffer amplifier A2. Thus, the buffer amplifier A2 suppresses the intrusion of noise from the output destination. Thereby, the reference voltage Vref can be made stable.

In this way, according to the circuit shown in FIG. 1, by using two bipolar transistors, namely the first bipolar transistor Q1 and the 0th bipolar transistor Q0 to adjust the resistors R3 and R1 and the area ratio n of the two bipolar transistors, the reference voltage Vref of which temperature dependence is suppressed can be obtained.

[Other Circuit Configurations]

Figure 2:
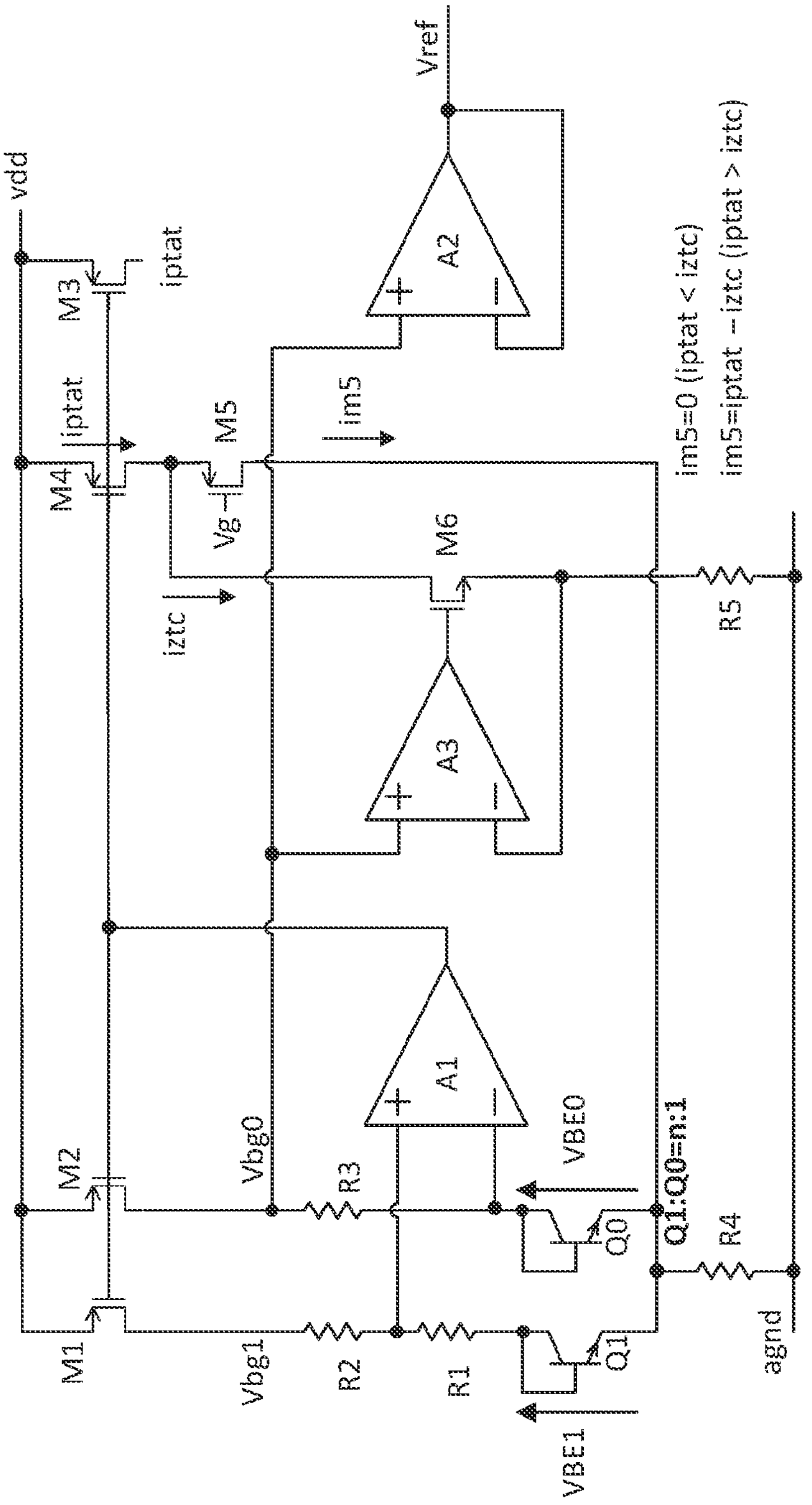
FIG. 2 is a circuit diagram showing another example of the reference voltage circuit according to the embodiment of the present invention.

FIG. 2 is a circuit diagram showing another example of the reference voltage circuit according to the embodiment of the present invention.

With regard to the reference voltage in the reference voltage circuit shown in FIG. 1, linear temperature dependence can be eliminated. However, it is known that the reference voltage obtained in this way has a negative secondary temperature characteristic. Therefore, n, R1, and R3 are adjusted to eliminate temperature dependence up to a predetermined temperature T1, and thus at or above the predetermined temperature T1, the reference voltage decreases in response to an increase in temperature.

In the reference voltage circuit shown in FIG. 2, a drop in the reference voltage at or above the predetermined temperature T1 is compensated by generating a correction voltage.

In this circuit, a correction resistor R4 is disposed between the emitters of both the first bipolar transistor Q1 and the 0th bipolar transistor Q0 and the ground agnd. Thus, emitter voltages of both the first bipolar transistor Q1 and the 0th bipolar transistor Q0 increase due to the current flowing through the correction resistor R4.

In addition, a fourth transistor M4 is connected to the power supply vdd. The fourth transistor M4 is a p-channel FET similar to the first transistor M1 and the second transistor M2, the gate of the fourth transistor M4 is commonly connected to the gates of the first transistor M1 and the second transistor M2, and the source of the fourth transistor M4 is connected to the power supply vdd.

The source of a fifth transistor M5 is connected to the drain of the fourth transistor M4, and the drain of the fifth transistor M5 is connected to a connection point between the correction resistor R4 and the emitters of the first bipolar transistor Q1 and the 0th bipolar transistor Q0. A voltage Vg which turns on the fifth transistor M5 is supplied to the gate of the fifth transistor M5.

The drain of a sixth transistor M6 which is an n-channel FET is connected to a connection point between the fourth transistor M4 and the fifth transistor M5. The source of the sixth transistor M6 is connected to the ground aged via a resistor R5.

In addition, an operational amplifier A3, in which the voltage Vbg0 is input to the positive input end, is arranged. The output end of the operational amplifier A3 is connected to the gate of the sixth transistor M6, and the negative input end of the operational amplifier A3 is connected to the source of the sixth transistor M6.

Thus, the operational amplifier A3 operates so that the source of the sixth transistor M6 becomes Vbg0. Here, the source voltage of the sixth transistor M6 is determined by the current flowing through the resistor R5, and thus the sixth current iztc flowing through the sixth transistor M6 equals Vbg0/R5, and the sixth current iztc constantly flows through the sixth transistor M6. Note that the sixth current iztc corresponds to the voltage Vbg0 and is referred to as zero temperature coefficient current.

In this circuit, the current iptat attempts to be made to flow by the fourth transistor M4 in the same way as the third transistor M3, but in a case that the current iztc is greater than the current iptat, the current iztc is made to flow by the fourth transistor M4. That is, the greater current of the current iztc and the current iptat is made to flow through the fourth transistor M4. The current is referred to as the fourth current.

The sixth transistor M6, through which the current iztc is made to flow is connected to the drain of the fourth transistor M4. Thus, when the current iptat flows through the fourth transistor M4, the current im5 flowing through the fifth transistor M5 equals iptat−iztc. In addition, when the current iztc flows through the fourth transistor M4, the current im5 flowing through the fifth transistor M5 equals 0.

The current im5 flowing through the fifth transistor M5 flows through the correction resistor R4 as a correction current. Thus, each of the emitter voltages of the first bipolar transistor Q1 and the 0th bipolar transistor Q0 increases by im5*R4, which serves as a correction voltage and is also added to the reference voltage Vref.

Figure 3:
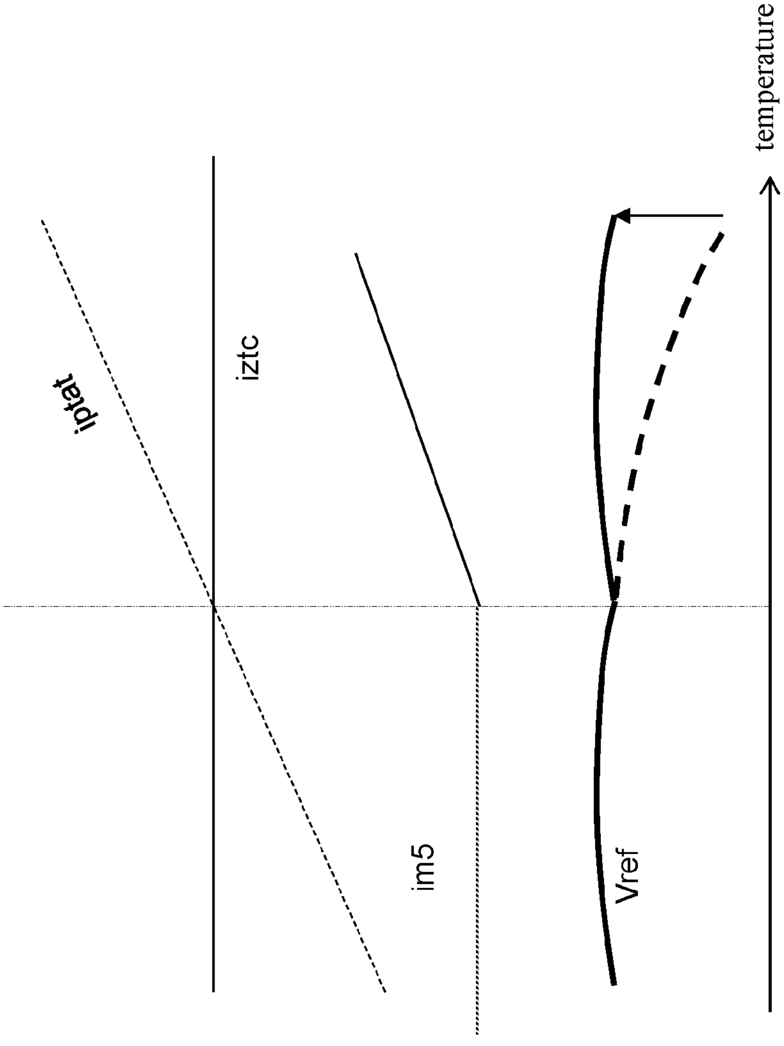
FIG. 3 is a diagram showing temperature characteristics of currents iptat, iztc, and im5 and a reference voltage vref.

FIG. 3 is a diagram showing temperature characteristics of currents iptat, iztc, and im5 and the reference voltage vref.

The reference voltage circuit shown in FIG. 1 is configured to have the best temperature characteristic at or below the predetermined temperature T1. Thus, at temperatures higher than the predetermined temperature T1, as shown by a dotted line in FIG. 3, the reference voltage Vref drops as the temperature rises due to the negative secondary temperature characteristic.

The current iptat is the same as the current iM1, and is expressed as [k*ln(n)/(Q*R1)]*T, which linearly increases as temperature rises. On the other hand, the current iztc is a current corresponding to the temperature coefficient at the temperature 0 K and is constant even if the temperature changes, and in the embodiment, the current iptat and the current iztc intersect at the predetermined temperature T1.

When the temperature T is lower than the predetermined temperature T1, iptat is less than iztc, and thus the fifth transistor M5 turns off and all of the current iptat flows through the sixth transistor M6. On the other hand, when the temperature T is higher than the predetermined temperature T1, iptat is greater than iztc, and the correction current im5 which equals iptat−iztc is generated. The correction current im5 is generated through subtracting a constant iztc from the linearly increasing iptat, and linearly increases as the temperature rises.

By making the correction current im5 to flow in the resistor R4, a voltage of im5*R4 is generated in the resistor R4, which serves as a correction voltage of the reference voltage Vref.

Here, the voltages vbg0 and vbg1 increases by an amount corresponding to the amount of current flowing through the correction resistor R4, but even in the case that the correction current im5 equals 0, currents from the first current path CP1 and the second current path CP2 flow through the correction resistor R4.

When the correction current im5 equals 0, the voltage Vr4 of the correction resistor R4 is $$Vr4=(iM1+iM2)*R4=2*iM1*R4$$

Therefore, in the circuit shown in FIG. 2, the resistors R2 and R3 may be reduced by an amount that matches with the voltage Vr4 as compared with that in the circuit shown in FIG. 1.

In this case, with regard to the reduction amount r2 of the resistors R2 and R3, $$r2*iM1=2*iM1*R4,$$

$$\text{thus, } r2=2*R4.$$

In addition, in view of the correction current im5, r2 may be set greater than 2*R4.

Furthermore, the correction based on the correction current im5 assumes that the correction is up to a predetermined temperature T2 higher than the predetermined temperature. Thus, at even higher temperatures, Vref drops due to the negative secondary characteristic. Therefore, a highly-precise Vref can be generated by adding a plurality of correction circuits that are the same as the correction circuit described above and generate correction currents at or above temperatures T3 and T4 that are higher than the predetermined temperature T2.

What is claimed is:

1. A reference voltage circuit, comprising:

a first current source, through which a first current is made to flow;

a second current source, through which a second current set at a certain ratio to the first current is made to flow;

a first current path, which comprises a second resistor, a first resistor, and a first bipolar transistor that are connected to the first current source in a sequential manner, and through which the first current is made to flow;

a second current path, which comprises a third resistor and a 0th bipolar transistor that are connected to the second current source in a sequential manner, and through which the second current is made to flow;

an operational amplifier, which controls current amounts of the first current and the second current by an output from an output end, and of which a positive input end is connected to a connection point between the second resistor and the first resistor, and of which a negative input end is connected to a connection point between the third resistor and the 0th bipolar transistor; and a buffer amplifier, which outputs a reference voltage, and of which a positive input end is connected to a connection point between the second current source and the third resistor, and of which a negative input end is connected to an output end; wherein an area ratio of the first bipolar transistor to the 0th bipolar transistor is n:1, and a reference voltage of which temperature dependence is corrected is obtained by adjusting resistance values of the first and the third resistor and a value of the area ratio n.

2. The reference voltage circuit according to claim 1, wherein the first current source comprises a first transistor through which the first current is made to flow, the second current source comprises a second transistor through which the second current is made to flow, gates of the first transistor and the second transistor are commonly connected, the output end of the operational amplifier is connected to the gates of the first transistor and the second transistor, and the first current and the second current are the same.

3. The reference voltage circuit according to claim 2, wherein the second resistor is disposed between the first transistor and the first resistor of the first current path, and resistance values of the second resistor and the third resistor are the same.

4. The reference voltage circuit according to claim 2 or 3, wherein in a case that temperature coefficients of base-emitter voltages of the first bipolar transistor and the 0th bipolar transistor are set as m, a resistance value of the first resistor is set as R1, a resistance value of the third resistor is set as R3, k represents the Boltzmann constant, and Q represents elementary charge, values of n, R1, and R3 are adjusted so that $$m=[k*\ln(n)/(Q*R1)]*R3.$$

5. The reference voltage circuit according to claim 2, comprising:

a sixth transistor, through which a sixth current corresponding to the reference voltage is made to flow;

a fourth transistor, through which a fourth current is made to flow, the fourth current corresponding to the greater current of a current corresponding to a current flowing through the first transistor or the second transistor and the sixth current;

a fifth transistor, through which a correction current obtained by subtracting the sixth current from the fourth current is made to flow; and a correction resistor, which is disposed between both the first current path and the second current path and ground, and through which the correction current is made to flow in addition to currents flowing through the first current path and the second current path; wherein temperature dependence of the reference voltage is further corrected.

6. The reference voltage circuit according to claim 5, wherein at a temperature higher than a predetermined temperature T1, the sixth current exceeds the fourth current.

* * * * *